March 11, 1930. E. F. SCHROEDER 1,750,027
ANIMAL TRAP
Original Filed May 13, 1927  4 Sheets-Sheet 2
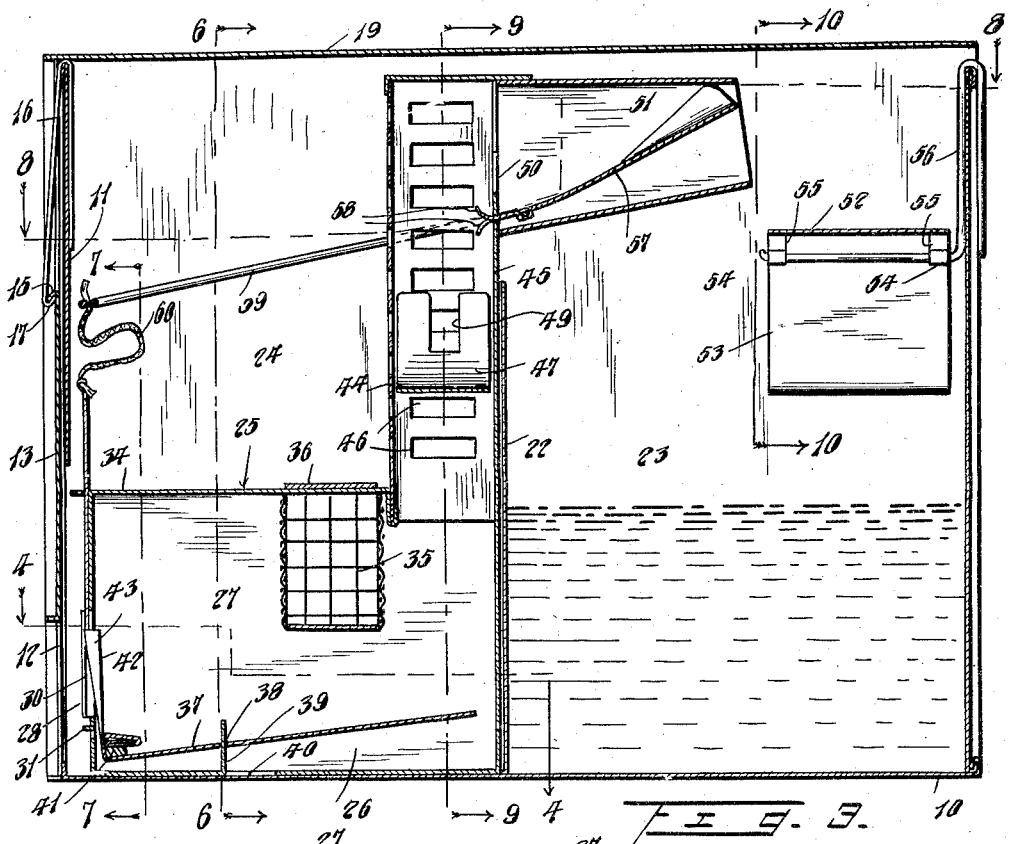

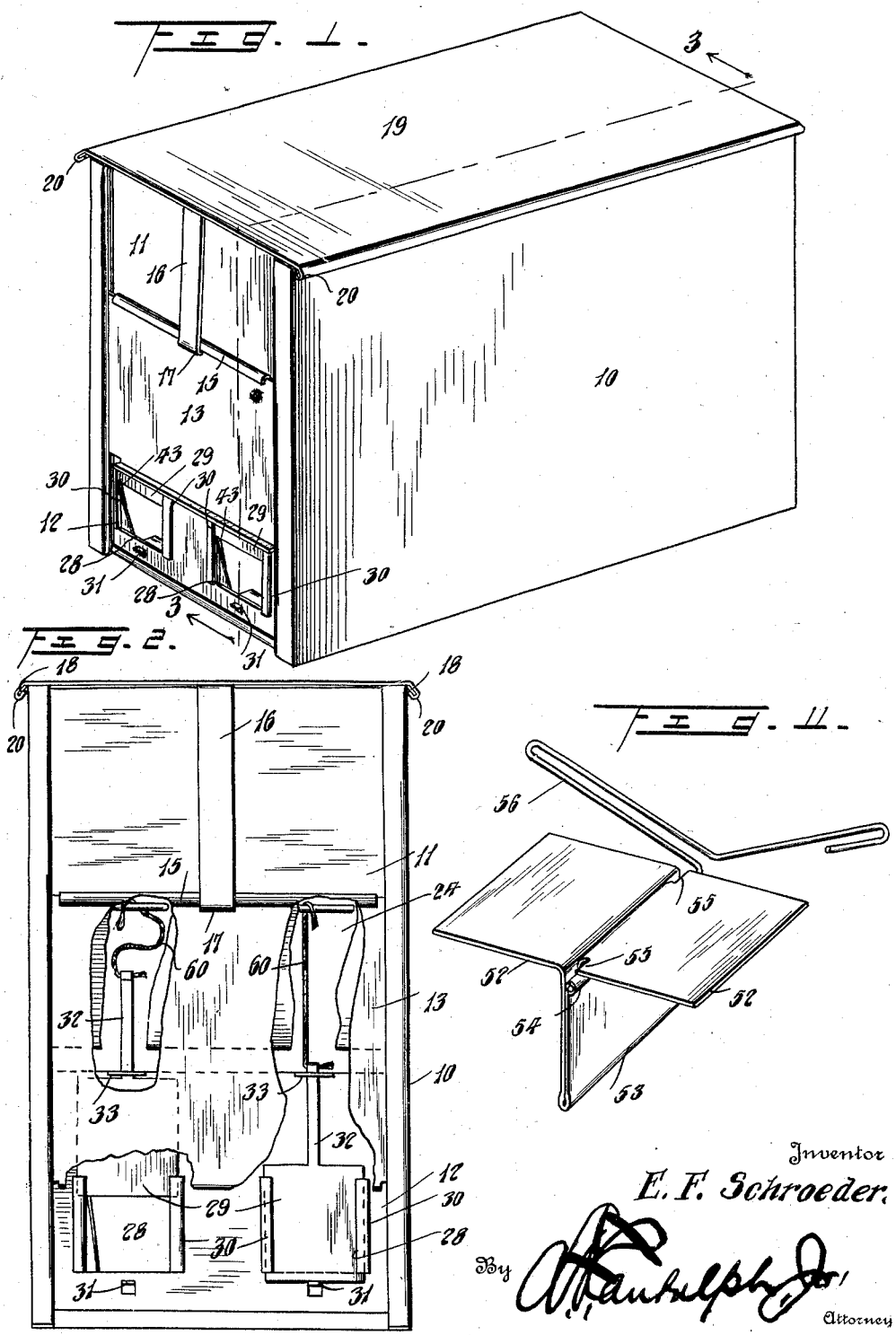

March 11, 1930. E. F. SCHROEDER 1,750,027
ANIMAL TRAP
Original Filed May 13, 1927 4 Sheets-Sheet 3
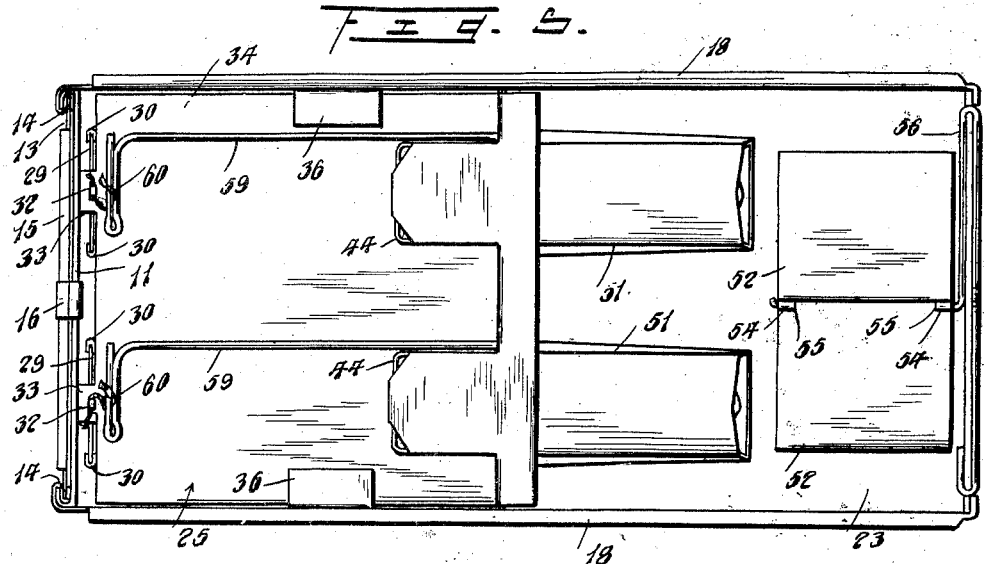
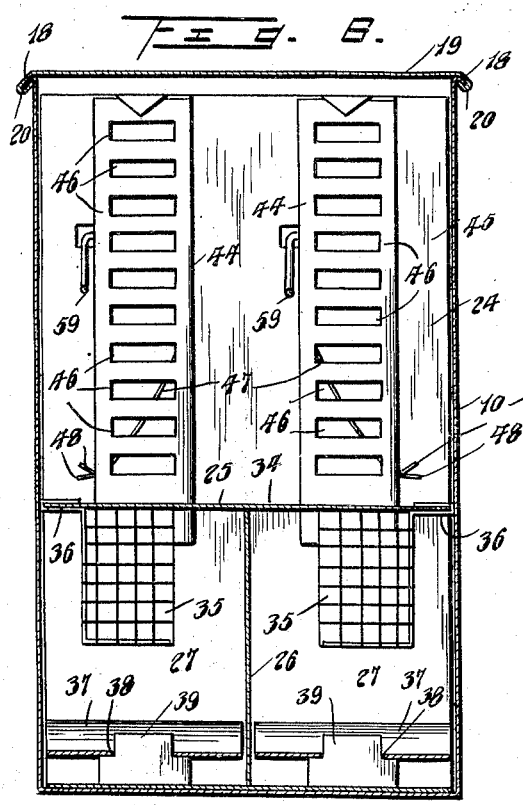
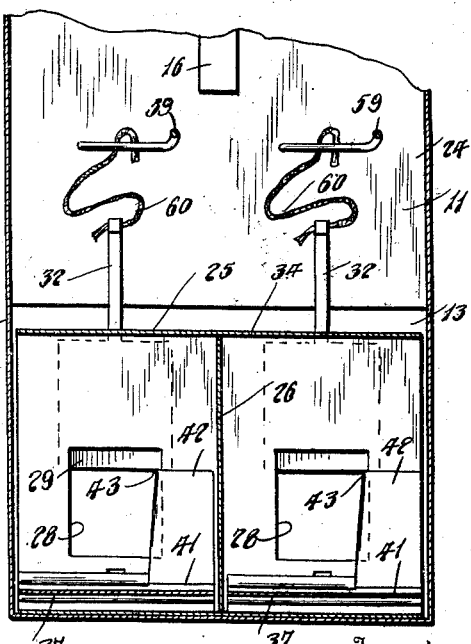
Inventor
E. F. Schroeder,
By
Attorney March 11, 1930.  E. F. SCHROEDER  1,750,027
ANIMAL TRAP
Original Filed May 13, 1927  4 Sheets-Sheet 4
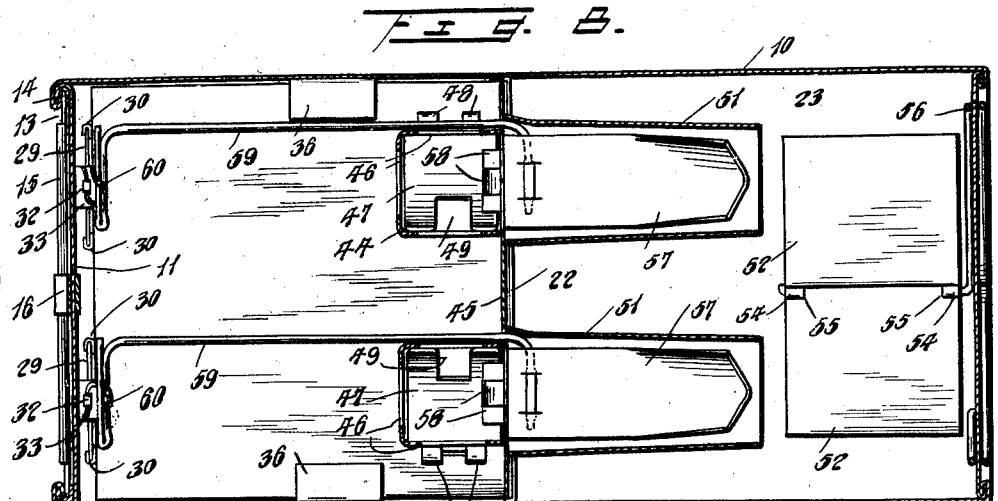
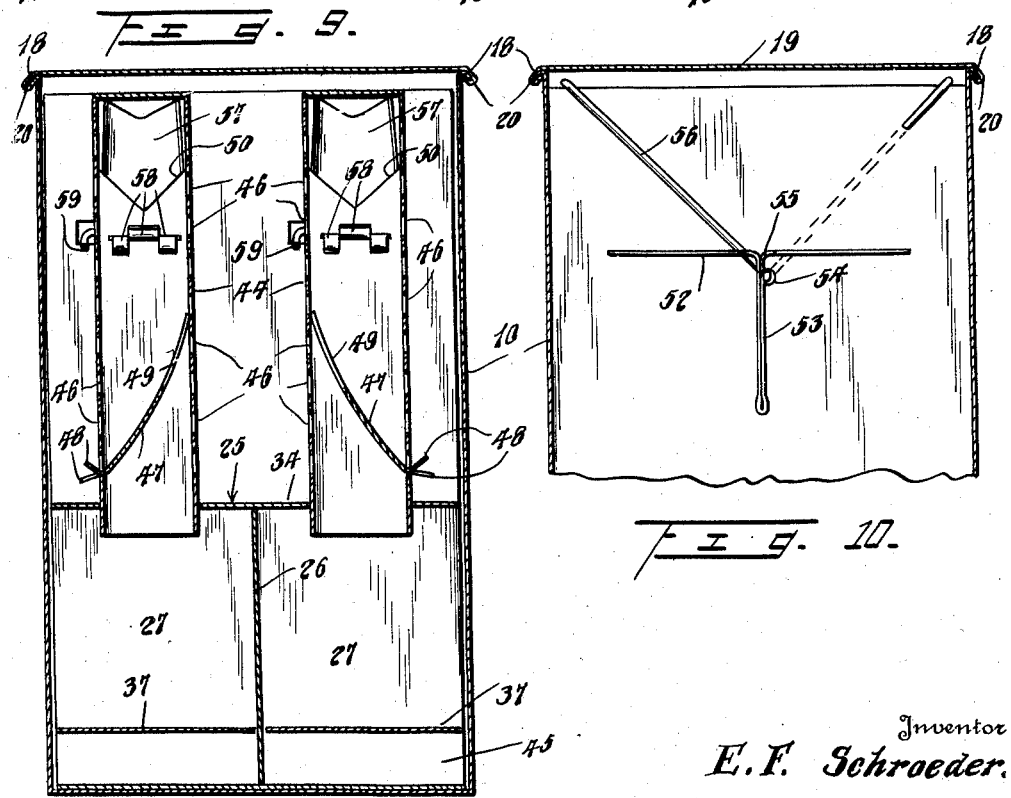
Inventor
E. F. Schroeder.
By
Attorney Patented Mar. 11, 1930

1,750,027

UNITED STATES PATENT OFFICE

EMIL F. SCHROEDER, OF WEYAUWEGA, WISCONSIN

ANIMAL TRAP

Application filed May 13, 1927, Serial No. 191,095. Renewed May 29, 1929.

This invention relates to a mouse, rat or other rodent trap.

It is aimed to provide a novel and more efficient construction and generally to improve an article of this character.

A specific object is to provide a novel means whereby the entrance door will be closed to the passage of the rodent to the trap and wherein such entrance door will be opened subsequently through the passage of the rodent through the trap, to accordingly automatically reset the same.

Another object is to provide a trap having a captive chamber preferably adapted to contain water or other liquid for drowning the rodents and is accessible through a vertical passageway.

Another important object is to provide a novel construction wherein the operating parts are substantially removably mounted within a casing so as to facilitate disassembly to remove drowned rodents and to cleanse the parts.

Various specific objects will in part be pointed out and become apparent from a consideration of the description following taken in connection with accompanying drawings illustrating an operative embodiment.

In said drawings:—

Figure 1 is a view of the trap in perspective;

Figure 2 is a front elevation thereof, parts being broken away to disclose details and one entrance door being elevated while the other remains closed;

Figure 3 is a longitudinal sectional view through the trap taken on the line 3—3 of Figure 1, the parts being in open position;

Figure 4 is a section view taken on the line 4—4 of Figure 3;

Figure 5 is a plan view of the trap, the cover being removed;

Figure 6 is a vertical sectional view taken on the line 6—6 of Figure 3;

Figure 7 is a vertical sectional view taken on the line 7—7 of Figure 3;

Figure 8 is a horizontal sectional view taken on line 8—8 of Figure 3;

Figure 9 is a vertical sectional view taken on the line 9—9 of Figure 3;

Figure 10 is a vertical sectional view taken on the line 10—10 of Figure 3; and

Figure 11 is a detail perspective view of a tilting platform and its support, as used for the captive chamber.

Referring specifically to the drawings, a generally rectangular casing is provided as at 10 which is closed at the bottom, sides and one end, thus being open at the top and at the other end being partially closed at its upper half as at 11 and open at its lower half at 12, which lower half may be closed, however, by a closure in the form of a slide 13 slidably mounted in ways or grooves 14 formed through the appropriate crimping of the adjacent engaging parts as well shown in Figure 8. The closure 13 has a manipulating or handle flange 15 which may be engaged by a clip 16, and removably suspended, as shown in Figure 3, by hooking it removably over the upper end of the wall 11 and at its lower end may have a hook 17 whereby it may be engaged with the flange 15 to hold the closure 13 elevated. Said clip 16 is preferably of flexible metal so that it may be moved appropriately for attachment and detachment with respect to the closure. Casing 10 at the upper edges of the sides has outwardly extending flanges 18 and the open top of the casing is closed by a plate 19 slidably applicable thereto and having hook flanges as at 20 adapted to slide on those at 18.

As well shown in Figure 3, the interior of the casing is subdivided by a transverse partition 22 which extends part way of its height on one side thereof to provide a captive chamber 23 which is adapted to contain water or other liquid as shown for the purpose of drowning captives.

On the other side of partition 22 is a chamber 24 in which a trapped body generally designated 25 is for the most part disposed, and usually and preferably removable. Such body 25 is for the most part closed at the bottom, top and rear but is open at the sides, being there closed by the adjacent side walls of the casing 10.

The body 25 may be longitudinally divided as by a partition at 26 to provide two entrance chambers 27 for the rodents. In lieu of two, it is obvious that a single chamber or more than two of such chambers may be provided if desired.

Through the front wall of the body 25 is an entrance opening or doorway 28 for each chamber 27. Each doorway 28 is controlled by a vertically slidable closure 29, operatively disposed in grooves formed by rebent flanges 30, integral with the front wall of the body. On such front wall, rests 31 may be struck out or otherwise provided, to support the doors 29 in lowermost position. Such doors 29 have stems 32 rising therefrom and guided through openings in brackets 33 struck from the body.

In each chamber 27, supported for instance from the top wall 34 thereof are suitable bait holders 35. Such bait holders may for instance be of reticulate material as shown and have hooks 36 fastened thereto and adapted to detachably engage the wall 34 at the sides thereof, so as to be securely held in place against displacement when the parts are assembled, as in Figure 6.

In each chamber 27 is a trip or tilting platform 37. Such platforms may have slots 38 therethrough so that lugs 39 struck upwardly from the bottom wall of the body may pass loosely therethrough to form in effect a neat joint. The upper ends of the lugs 39 are reduced and hence shoulders at 40 are provided on which such platforms rest and fulcrum. Such platforms 37 are weighted as at 41, at their front ends and such ends have portions 42 upstanding and laterally bent as at 43. As the result of this structure, the weights 41 urge the platforms 37 downwardly at their front ends and hence the portions 43 move into the openings 28 so that they will be disposed under the closures 29 and support them in elevated position, as well shown in Figure 3. Upon a rodent entering either chamber 27, however, decoyed by the bait within the holder 35 therein, it will tread upon the platform in the rear of the lugs 39, thus overbalancing it and moving the elements 43 out of the path of downward movement of the door 29, so that such door will then be free by gravity to automatically lower and close thus trapping the rodent.

Supported on or fastened to the top of the body 25 is a U-shaped channel 44 whose open side is arranged against the rear wall 45 of the body which extends a considerable distance above the partition wall 22. The channel members 44 are in communication with the interior of chambers 27 and their sides are slotted as at 46 or otherwise rendered reticulate so that the light which may penetrate the joints of the structure may be seen by the captive in the chamber 27 and thus lure it to climb the channel 44. In said channel are arranged inclined return guards 47 which preferably have a plurality of lugs 48, as well shown in Figure 9, extending loosely through one of the slots 46, and being bent in opposite directions to secure the return guards in place and form a hinge joint therefor. Such guards are preferably slotted as at 49 so that the light may better be seen by the rodent and so that the rodent in ascending the channel may better engage the guards 47 to automatically displace the same. The guards, however, will prevent the rodent returning to the chamber 27.

The wall 45 has outlet openings 50 which lead to outlet ducts 51 suitably supported on the wall 45. The rodents in their flight pass through the openings 50 and ducts 51 and jump onto a tilting platform as at 52. Said tilting platform 52 may be of any appropriate construction. It may have a depending web 53 which is pivotally mounted and balanced at 54 on a rod 55 forming a part of a generally triangular bracket 56 removably hooked over the upper edge of the rear wall of casing 10. Thus as the rodent lights on the platform 55, the latter will tilt and the rodent will be plunged into the water in the captive chamber 23 and drown.

It will be noted that a trip lever 57 is located in each duct 51 and the same may have lugs 58 passed loosely through openings in the wall 45 and then bent at different angles in order to prevent its detachment and provide a hinge joint. In addition, trip levers 57 have rigidly fastened thereto arms or rods 59 which at one end have flexible elements 60 secured thereto and which elements in turn are secured to the stems 32 of the doors 29. Thus it will be seen that a rodent when depressing the lever 57 in leaving the duct 51 causes the rods 59 to elevate, thus drawing the cables or flexible elements 60 taut and elevating them, accordingly elevating the doors 29, so that the weight 41 will cause the tilting platform 37 to move to reset position with the elements 43 in the doorways 28 and thus intercepting downward movement of the doors.

Generally to recapitulate the operation, there is a trap in the set condition of Figure 3, the rodent will enter lured by the bait in the holder 35. When such rodent passes the lugs 39, the tilting platform 37 will be overbalanced, thus moving the elements 43 out of the path of downward movement of the door 29, and thus door 29 immediately moves downwardly to closed position trapping the rodent. In his flight, the rodent lured by the light observed through the openings 46 will climb channel members 44, passing and displacing the guards 47, being prevented from returning past the guards 47 as the latter automatically fall to their normal position after the rodent passes the same. The rodent then leaves through the opening 50 and duct 51, in its course through the duct tilting the lever 57 and moving the arm 59 upwardly thus drawing the flexible elements 60 upwardly and accordingly elevating the door 29 so that the weight 41 will cause the tilting platform 37 to move to normal position where the element 43 will be in the path of downward movement of the door, whereupon the trap is automatically reset. The rodent in leaving the duct 51 jumps onto the tilting platform at 52 which tilts as soon as it is touched, causing the rodent to fall into the liquid in the captive chamber 23 and be drowned.

Various changes may be resorted to provided they fall within the spirit and scope of the invention.

What is claimed is:—

A trap of the class described having a casing provided with a partition therein to form a captive chamber on one side thereof, a body disposed in the casing at the other side of the partition, said body having a top and a partition disposed at a right angle to the first mentioned partition to form entrance chambers, said body being open at the side of said entrance chambers whereby the chambers will be closed at the side by the adjacent side walls of the casing, said casing being open at one end wall, entrance openings through the body at the front walls of said entrance chambers, closures for said openings, a tilting platform in each entrance chamber, said platforms normally maintaining the closures open, channel members extending upwardly from each entrance chamber, an outlet duct extending from each passage member across the first mentioned partition wall and into the captive chamber, said entrance platforms being arranged for tilting by a rodent thereon so as to release the door for closing movement, levers having parts in said ducts adapted for engagement by a rodent, and connections between said levers and said closures, whereby when the levers are actuated by the rodent they will restore the closures to open position.

In testimony whereof I affix my signature.

EMIL F. SCHROEDER.